Patented Nov. 25, 1924.

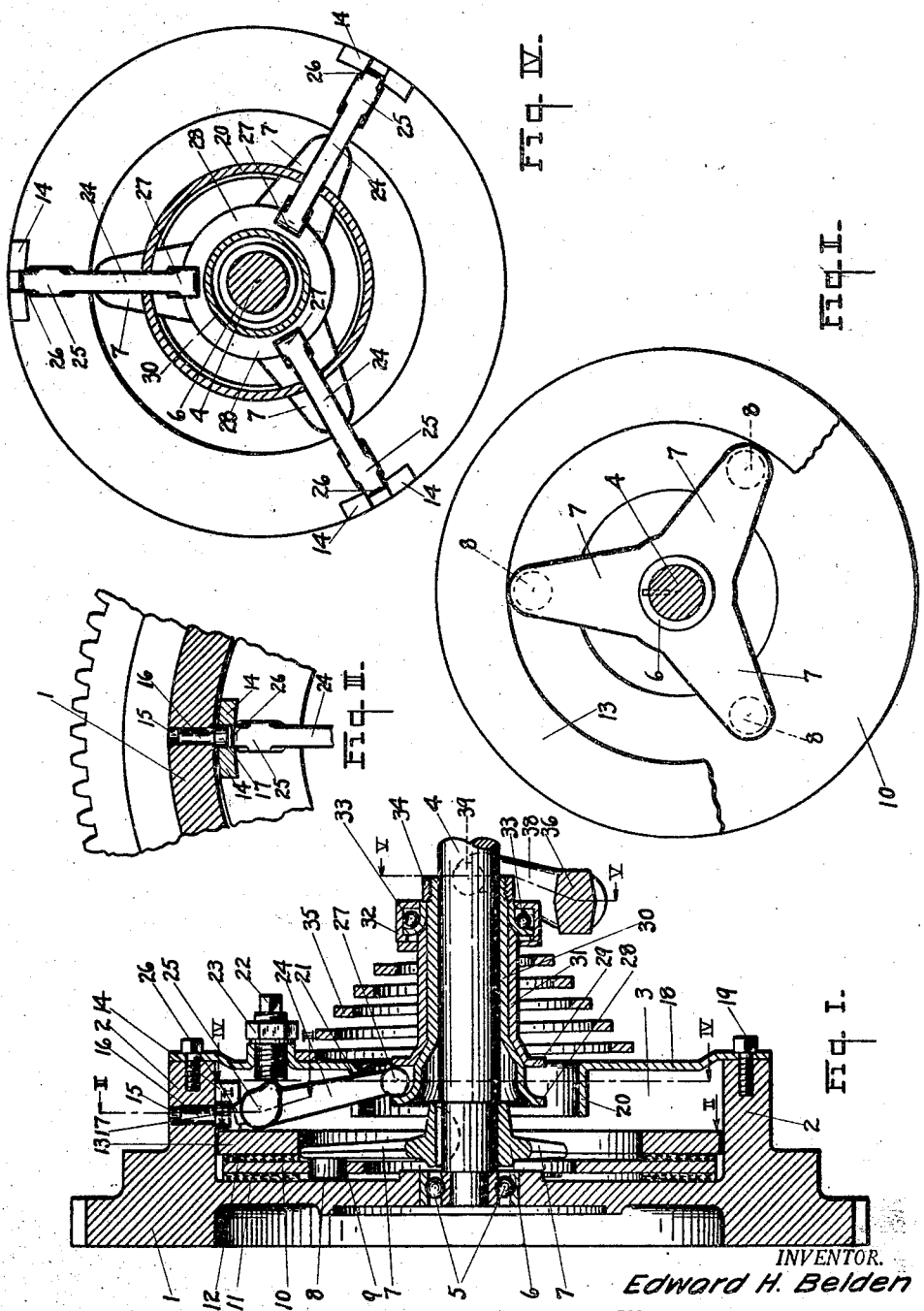

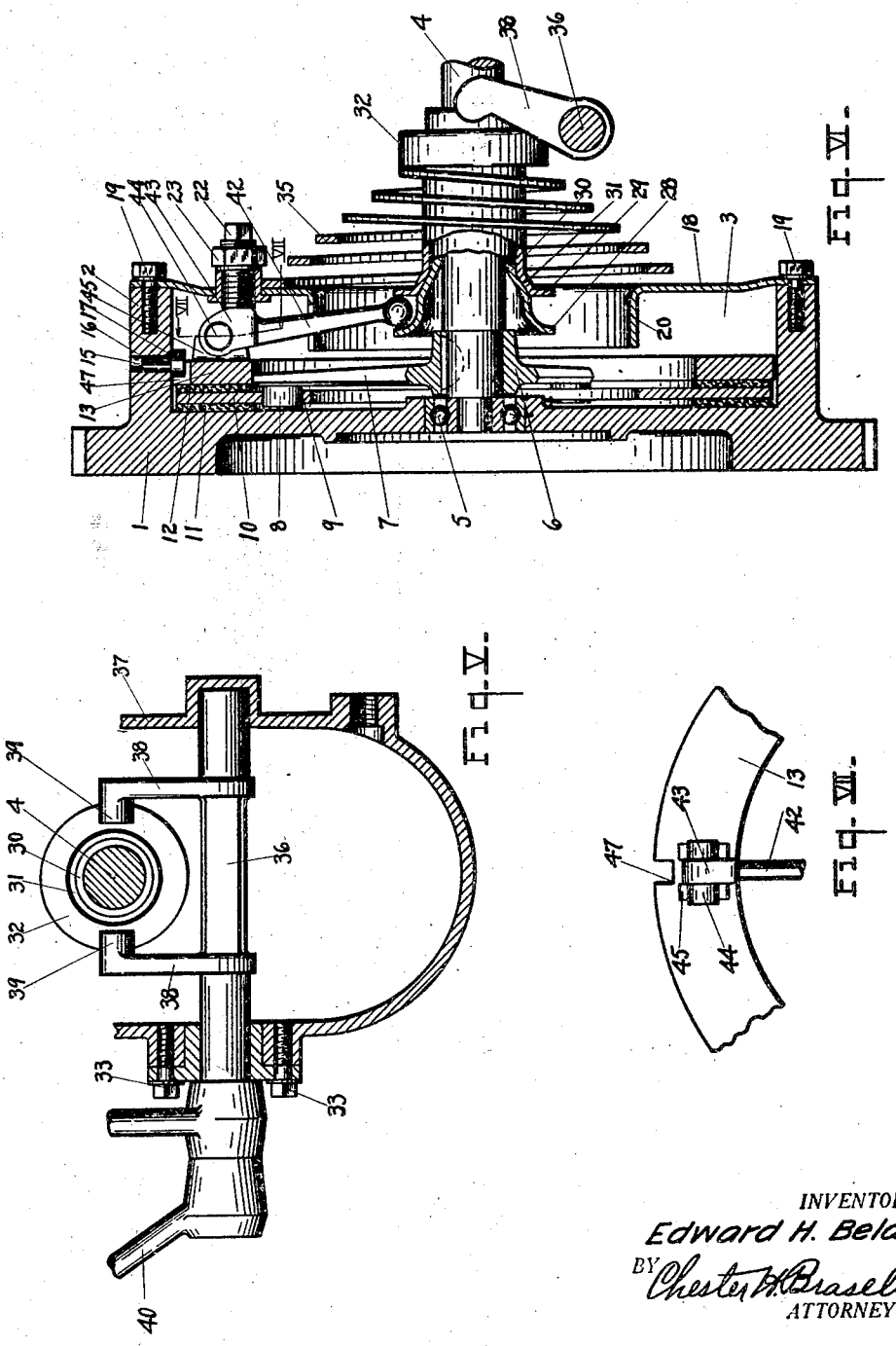

1,516,699

UNITED STATES PATENT OFFICE.

EDWARD H. BELDEN, OF TOLEDO, OHIO, ASSIGNOR, BY MESNE ASSIGNMENTS, TO THE WILLYS-OVERLAND COMPANY, OF TOLEDO, OHIO, A CORPORATION OF OHIO.

CLUTCH.

Original application filed July 19, 1917, Serial No. 181,556. Divided and this application filed March 21, 1919. Serial No. 284,139.

*To all whom it may concern:*

Be it known that I, EDWARD H. BELDEN, residing at Toledo, county of Lucas, State of Ohio, have invented certain new and useful Improvements in Clutches, of which I declare the following to be a full, clear, and exact description.

This invention relates to improvements in clutch mechanism, such as is particularly adapted for use in connecting the drive shaft to the driven shaft of an automobile. This application is a division of an application filed by me resulting in Patent No. 1,421,761, issued July 4, 1922.

One object of the invention is to provide an improved clutch, which is of simple construction and which can be readily adjusted in case of wear, the parts of said clutch being readily accessible for purposes of replacement, adjustment, or repair.

A further object of the invention is to provide a simple and efficient form of clutch mechanism of the character illustrated herewith.

Further objects of the invention relate to economies of manufacture and details of construction as will hereinafter appear from the detailed description to follow.

The objects of the invention are accomplished in one instance by the devices and means described in the following specification, but it is evident that the same may be varied widely without departing from the scope of the invention, as pointed out in the appended claims.

A structure constituting one embodiment of the invention, which may be the preferred, is illustrated in the accompanying drawing forming a part hereof, in which:

Figure I is an enlarged sectional view, of the clutch mechanism, illustrating the relative position of the various operating parts with respect to each other.

Figure II is a vertical sectional view, taken along the line II—II of Figure I, with a portion of the clutch ring broken away.

Figure III is a detail sectional view, taken substantially along the line III—III of Figure I, and illustrating the manner of controlling the movement of the clutch ring with respect to the fly wheel.

Figure IV is a vertical sectional view taken substantially along the line IV—IV of Figure I, and showing in detail the levers for operating the clutch.

Figure V is a vertical sectional view, taken substantially along the line V—V of Figure I and showing the manner of operating the clutch.

Figure VI is a sectional view corresponding to Figure I, but showing a modified construction of the clutch.

Figure VII is a detail sectional view, taken substantially along the line VII—VII of Figure VI, and illustrating the manner of connecting one of the clutch operating levers to the clutch ring.

Similar reference characters refer to corresponding parts throughout the several views, and the sectional views are taken looking in the direction of the small arrows at the ends of the section lines.

In the embodiment of the invention illustrated herewith, the fly wheel 1 is driven from the engine in any suitable manner and has a rearwardly projecting annular flange 2, forming within the fly wheel the chamber 3 in which the clutch mechanism is housed. The driven shaft 4 has its forward end journaled in the fly wheel 1, a bearing 5 being provided for that purpose, as shown in Figure I of the drawing. The hub 6 of a spider is secured to the shaft 4, said spider having the radiating arms 7, which are provided with laterally projecting pins 8 fitting in openings 9 provided in the disc 10 which is disposed within the chamber 3 and has a central opening through which the shaft 4 extends.

A disc of suitable friction material 11 is inserted between the fly wheel 1 and the disc 10, and a disc of suitable friction material 12 is inserted between the disc 10 and a ring 13 disposed within the chamber 3, as shown in Figure I of the drawing. Laterally projecting ears 14 are formed on said ring 13 and radial openings 15 are provided in the flange 2 of the fly wheel, in which the stems 16 of pins provided with heads 17 are disposed, said heads 17 being normally disposed between the ears 14 of the ring 13 so that the rotation of said ring 13 relative to the fly wheel is prevented by means of the pins 16. A plate 18 is secured to the outer edge of the flange 2 by means of bolts 19, said plate being provided with a central inwardly projecting flange 20, which is slotted at 21 to accommodate the levers for operating the clutch. Said plate 18 thus forms a cover for the chamber 3 within which the clutch discs are housed. A plurality of bolts 22 are adjustably mounted in said plate 18 and provided with lock nuts 23 to hold them in their adjusted positions, there being one of these bolts for each of the levers for operating the clutch disc, so that the engagement of the levers with the clutch discs may be adjusted from time to time in a manner which will be hereinafter described.

To operate the clutch, there is provided three full floating levers 24, each of which has a head 25 provided with an upwardly extending projection 26, which is normally disposed between the ears 14 on the ring 13, to prevent displacement of the pins, 16, as shown in Figure I of the drawing. The head 25 is so disposed as to engage the ring 13 and is fulcrumed on the end of one of the bolts 22. The said lever is provided with a tail portion 27, which is loosely disposed between the flanges 28 and 29, provided on the forward ends of the sleeves 30 and 31. It will be understood that the term "full floating" as applied to the levers has a definite meaning and serves to distinguish the levers from those which have fixed pivots at either their inner or outer ends or at any other point. The sleeve 30 is slidably mounted on the shaft 4 and is provided at its forward end with an outwardly extending flange 28, and the sleeve 31 is fixed on the sleeve 30 so as to move therewith, and is provided with an outwardly extending flange 29, said flanges 28 and 29 forming an annular space between them which receives the tail portions 27 of the levers 24 for operating the clutch. A bearing ring 32 is mounted on the end of the sleeve 30, being provided with a bearing 33, and is adjustably held thereon by means of the ring 34 mounted on the sleeve 30. A spring 35 is compressed between the plate 18 which covers the chamber 3 in the fly wheel and said ring 32, said spring serving to normally hold the sleeves 30 and 31 in their rearward position so as to hold the clutch discs in engagement with each other. A rock shaft 36 is journaled in the casing 37 and provided with a pair of arms 38 each of which is provided with a laterally extending finger 39 engaging with the ring 32 to force the sleeves 30 and 31 laterally, in order to release the clutch discs. Said rock shaft 36 is operated by means of the arm 40 which is secured thereto and extends upwardly and laterally and carries at its upper end a pedal (not shown).

In the modified form of clutch illustrated in Figures VI and VII, which resembles the preferred form in general, but differs therefrom in that the levers 42 for operating the clutch are provided with heads 43 having laterally projecting pins 44 which are pivoted in the laterally projecting ears 45 on the ring 13 while the main portion of the head extends between said ears so as to prevent lateral movement of said ring relative to the lever in a manner which will be clearly apparent. The relative movement of the ring 13 relative to the fly wheel is prevented by means of the engagement of the head 17 of the pin 16 in the notch 47 provided in the periphery of the disc or ring 13. This arrangement makes a slightly more compact clutch than the form illustrated in Figure I, but as will be readily understood it operates in substantially the same manner.

In the operation of the improved clutch mechanism, the fly wheel 1 is driven by the engine shaft in the usual manner and is coupled to the driven shaft 4 by the clutch mechanism, which is housed within the chamber 3 formed by the annular flange 2 on the fly wheel. The forward end of the shaft 4 is journaled in the fly wheel in the bearing 5. The disc 10 travels with the shaft 4, said disc being secured thereto by means of the laterally projecting pins 8 carried by the radiating arms 7 of the spider hub 6 which is secured to the shaft 4, said pins 8 engaging in openings 9 provided in the disc 10. The ring 13 travels with the fly wheel since engagement of the heads 17 of the pins 16 which are carried in radial openings provided in the flange of the fly wheel between the ears 14 on the ring 13 prevents rotation of said ring 13 relative to the fly wheel, but permits the lateral movement of said ring relative to the fly wheel. It will thus be seen that the disc 10 turns with the shaft 4 and is movable laterally thereto, while the ring 13 turns with the fly wheel 2 and is movable longitudinally thereof. Discs of friction material 11 and 12 are interposed between the ring 13 and the fly wheel 1 so that as said ring 13 is pressed towards the fly wheel, it compresses the friction discs 11 and 12 and squeezes them together against the disc 10 so that said disc 10 will be caused to travel with the fly wheel. The spring 35 normally tends to hold the clutch in engagement so that the shaft 4 moves with the fly wheel, since said spring 35 tends to force the sleeves 30 and 31, which are movably mounted upon the shaft 4 rearwardly, so as to move the tail portions 27 of the levers 24 rearwardly for operating the ring. These levers fulcrum on the ends of the adjustable bolts 22, which are threaded through the plate 18. The head 25 of each lever is provided with a cam portion which rests upon the end of one of the bolts 22, and the head 25 has another portion which engages the ring 13 so that there is a lever action tending to move said ring towards the fly wheel to compress the discs together and form a driving connection between the fly wheel and the shaft 4. The engagement of the projection 26 between the ears 14 on the ring 13 prevents movement of the lever 25 relative to the ring 13. The bolts 22 may be adjusted in the plate 18 so as to vary the fulcrum point of the levers 25 and thus vary the tension of the clutch. One end of the spring 35 engages the plate 18 and the other end engages the bearing ring 32, which is mounted on the sleeve 30, and supported so as to rotate relative thereto. To throw the clutch out of engagement, the sleeves 30 and 31 can be pushed forwardly by means of the rock shaft 36 in the usual manner, and this will carry the tail portions 27 of the levers forwardly, so as to release the pressure on the ring 13 and permit the fly wheel to rotate without driving the shaft.

The modified form of clutch illustrated in Figures VI and VII is substantially the same as that shown in Figure I, except that in this case, the head 43 of the lever 42 for operating the clutch disc is prevented from moving laterally relative to the ring 13 by engagement of the head between the blocks 45, while the pins 44 which project laterally from the head exert their thrust against the filler blocks 45. The ring 13 is prevented from rotating relatively to the fly wheel by means of the engagement of the heads 17 of the pins 16 in the notches 47 formed in the periphery of said disc.

While I have shown in considerable detail a specific embodiment of my invention, it is to be understood that this showing and description is illustrative only and for the purpose of rendering my invention more clear, and that I do not regard the invention as limited to the details of construction, illustrated or described, nor any of them, except in so far as I have included such limitation within the terms of the following claims, in which it is my intention to claim all novelty inherent in my invention broadly as well as specifically.

What I claim as new and desire to secure by Letters Patent is:

1. In a device of the class described, the combination of a driven fly wheel having an annular laterally extending flange, a shaft having one end journaled in said fly wheel, a disc having a plurality of openings therein, a spider fixed on said shaft and having a plurality of radiating arms each provided with a laterally projecting pin disposed in one of said openings, a ring provided with a plurality of pairs of spaced ears adjacent to the periphery thereof, said flange having a plurality of openings extending radially of the fly wheel, a pin disposed in each of said openings and having a head extending between the ears of one of said pairs, a plate secured to said flange, a plurality of bolts adjustably mounted in said plate, a freely mounted lever fulcrumed on each of said bolts and having a head engaging said ring and provided with a projection extending between said ears, a sleeve slidable on said shaft and engaging the tail of said lever to rock the same, spring means for moving the sleeve in one direction, and means for moving said sleeve against the tension of said spring.

2. In a device of the class described, the combination of a driven fly wheel having an annular laterally extending flange, a shaft, a disc, a spider fixed on said shaft and having a plurality of radiating arms each connected to said disc whereby said disc is driven from said shaft, a ring provided with a plurality of pairs of spaced ears adjacent the periphery thereof, said flange having a plurality of openings extending radially of the fly wheel, a pin disposed in each of said openings and having a head extending between the ears of one of said pairs, a plate secured to said flange, a plurality of bolts adjustably mounted in said plate, a freely mounted lever fulcrumed on each of said bolts and having a head engaging said ring, and provided with a projection extending between said ears, a sleeve slidable on said shaft and engaging the tails of said levers to rock the same, spring means for moving the sleeve in one direction, and means for moving said sleeve against the tension of said spring.

3. In a device of the class described, the combination of a driven fly wheel having an annular laterally extending flange, a shaft, a disc rotating with said shaft, a ring provided with a plurality of pairs of spaced ears adjacent the periphery thereof, said disc being disposed between said ring and said fly wheel, and said flange having a plurality of openings extending radially of the fly wheel, a pin disposed in each of said openings and having a head extending between the ears of one of said pairs, a plate secured to said flange, a plurality of bolts adjustably mounted in said plate, a freely mounted lever fulcrumed on each of said bolts and having a head engaging said ring and provided with a projection extending between said ears, a sleeve slidable on said shaft and engaging the tails of said levers to rock the same, spring means for moving the sleeve in one direction, and means for moving said sleeve against the tension of said spring.

4. In a device of the class described, the combination of a driven fly wheel having an annular laterally extending flange, a shaft, a disc rotating with said shaft, a ring provided with a plurality of pairs of spaced ears adjacent the periphery thereof, said ring being carried by said flange so as to be non-rotatable relative thereto but movable laterally thereof, a plate secured to said flange, a plurality of bolts adjustably mounted in said plate, a freely mounted lever fulcrumed on each of said bolts, and having a head engaging said ring and provided with a projection extending between said ears, a sleeve slidable on said shaft and engaging the tails of said levers to rock the same, spring means for moving the sleeve in one direction, and means for moving said sleeve against the tension of said spring.

5. In a device of the class described, the combination of a driving member, a driven shaft, a disc, a ring carried by said driving member, having laterally projecting lugs at one side thereof adjacent its periphery, pins mounted upon said driving member and extending between said lugs to prevent rotation of said ring relatively to the driving member, levers fulcrumed upon said driving member adapted to prevent displacement of said pins, and means for actuating said levers.

6. In a device of the class described, the combination of a driving member, a driven shaft, a disc, a ring carried by said driving member, provided with a plurality of laterally extending lugs, pins carried by said driving member and extending between said lugs to prevent rotation of the ring relatively to the driving member, a plurality of pivoted levers for actuating said ring having projections extending between said lugs to prevent displacement of said pins, and means for actuating said levers.

7. In a device of the class described, the combination of a driving member, a driven shaft, clutch mechanism associated with said driving member, a sleeve slidably mounted upon said shaft, provided with a flange, a second sleeve upon the first mentioned sleeve having a flange spaced from the last mentioned flange, a plurality of floating levers for actuating said clutch mechanism having their inner ends loosely positioned between said flanges, and means for actuating said sleeves.

8. In a device of the class described, the combination of a driving member, a driven shaft, a disc, a ring within said driving member, a sleeve upon said shaft, the outer end of which projects exteriorly of said driving member, a spring interposed between the driving member and said outer sleeve end and normally tending to move the sleeve outwardly with respect to the driving member, floating levers having their inner ends engaging said sleeve and their outer ends resting upon said ring, projections upon the outer sides of said levers intermediate their ends forming fulcrum points for the same and stops upon said driving member forming seats for said projections.

9. In combination, a fly-wheel having an over-hanging flange, clutch elements within said flange, full floating levers for operating said clutch elements, guides for said levers near the opposite ends thereof, and means for actuating said levers.

10. In combination, a fly-wheel having an over-hanging flange and an inwardly extending housing attached to said flange, clutch elements within said flange including a pressure ring, full floating levers for operating said clutch elements, guides on said ring and housing for maintaining the levers in position, and means at the inner ends of the levers for actuating the same.

In testimony whereof, I affix my signature.

EDWARD H. BELDEN.